(No Model.)
2 Sheets—Sheet 1.

H. BRYAN.
GRAIN CLEANER ATTACHMENT.

No. 468,069. Patented Feb. 2, 1892.

(No Model.) 2 Sheets—Sheet 2.

H. BRYAN.
GRAIN CLEANER ATTACHMENT.

No. 468,069. Patented Feb. 2, 1892.

Witnesses:

Inventor,
Henry Bryan
By Dewey & Co.
Att'ys

UNITED STATES PATENT OFFICE.

HENRY BRYAN, OF MODESTO, CALIFORNIA.

GRAIN-CLEANER ATTACHMENT.

SPECIFICATION forming part of Letters Patent No. 468,069, dated February 2, 1892.

Application filed October 2, 1891. Serial No. 407,560. (No model.)

*To all whom it may concern:*

Be it known that I, HENRY BRYAN, a citizen of the United States, residing at Modesto, Stanislaus county, State of California, have invented an Improvement in Grain-Cleaner Attachments; and I hereby declare the following to be a full, clear, and exact description of the same.

My invention relates to an attachment for grain-cleaners. It is especially adapted for use upon traveling harvesters, and is useful in properly distributing the grain and chaff from the sides toward the center of the cleaning-shoe when the machine is working upon side hills; and my invention consists in the construction and combinations of devices, which I shall hereinafter fully describe and claim.

Figure 1:
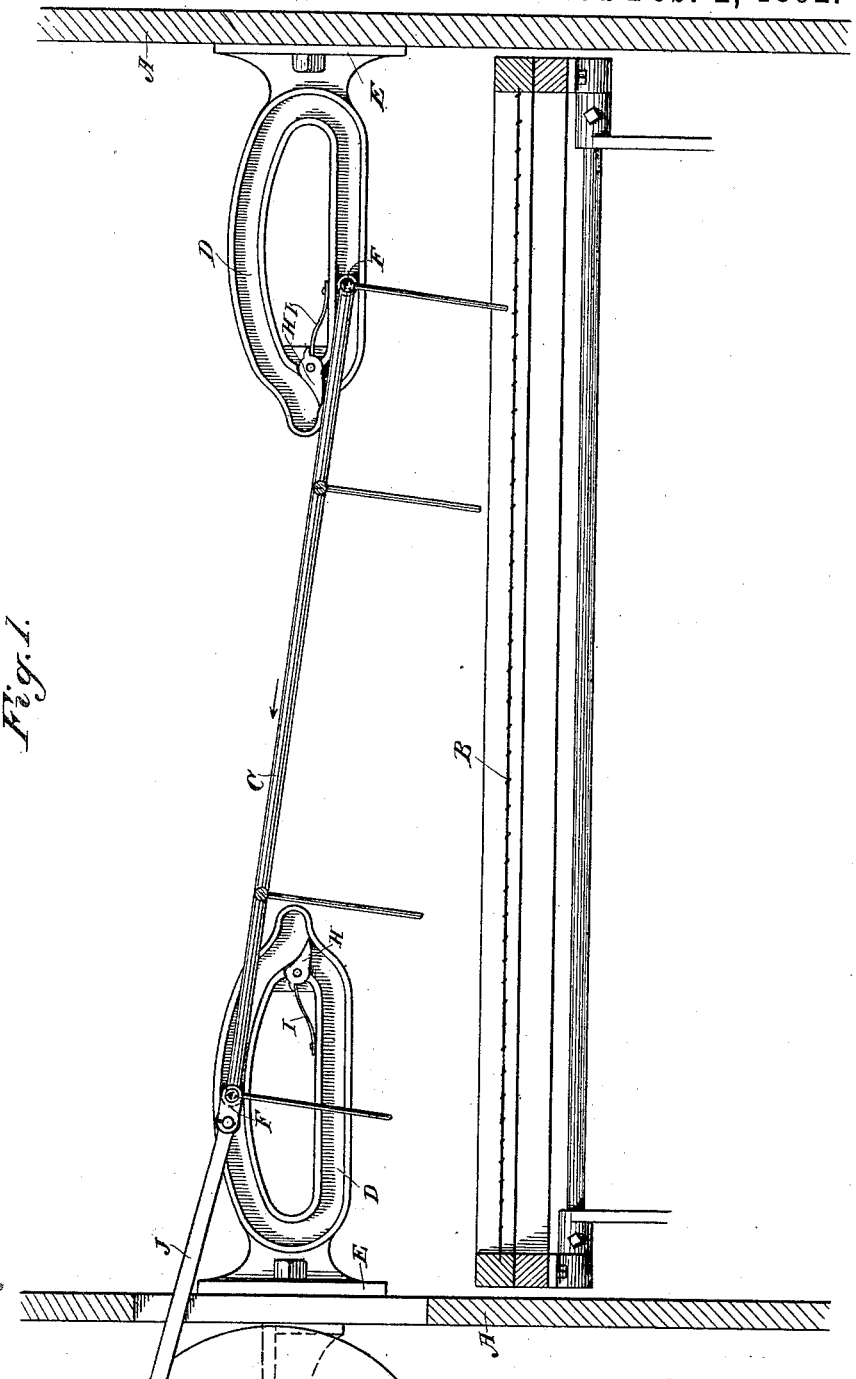
Figure 2:
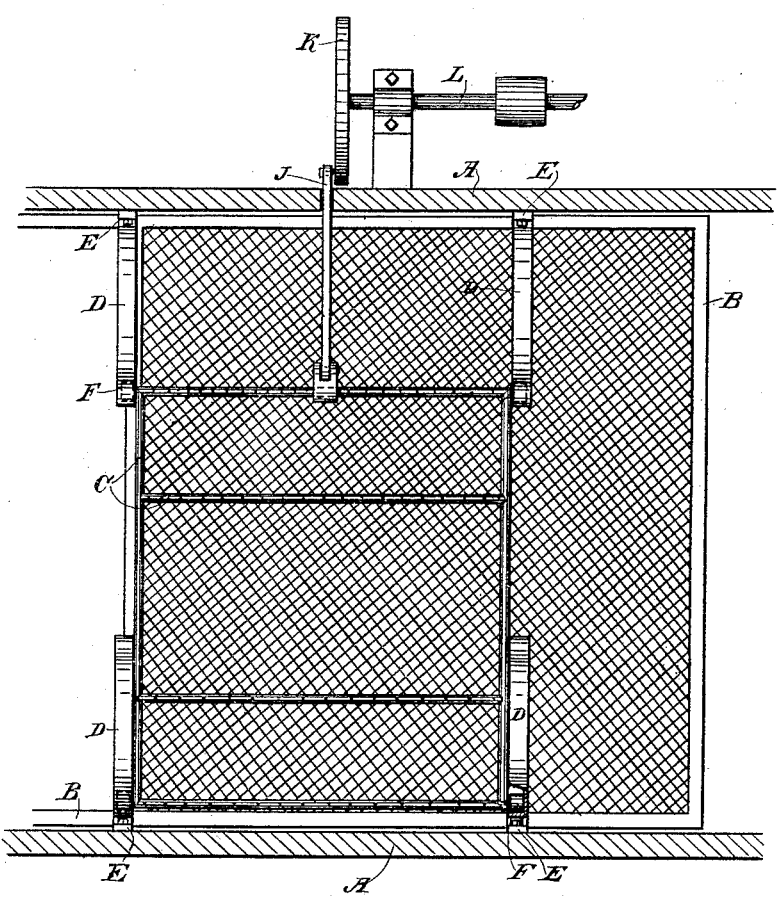

Figure 1 is a vertical cross-section through my device. Fig. 2 is a plan view of the same.

A A are the sides of the thrashing-machine.

B is the screen of the cleaning-shoe, which is suitably supported within the machine and receives the proper oscillating motion for the purpose of separating the grain from the chaff. When these machines work upon hillsides, the tendency of the grain and chaff is to pile upon the lower side of the screen, thus leaving the upper side and central portions empty, so that the blast of air from the fan passes freely through the screen and without effect upon the mass of material which is piled up at the lower side. In order to overcome this difficulty, I employ rakes which consist of a light frame of gas-pipe or other suitable material C, having a sufficient number of crossbars with teeth projecting downwardly from them to points just above the surface of the screen. In order to operate this device, I have shown the peculiarly-shaped cams D, which have oblong or oval grooves or channels formed within their periphery, as shown. These cam-guides are fixed to supports E, which project from the sides of the machine toward the interior and above the screen B.

F are anti-friction rollers journaled upon short shafts or spindles which project from each of the corners of the frame C, and these rollers just fit in the channels of the cam-guides D. At the ends of the cam-guides, nearest to each other, are pivoted the guiding-latches H, the pivot-point being at the inner side of the cam groove or channel, while the movable outer end or point of the latch H rests against the bottom of the groove, and is held in place by a light spring I, acting upon a lug on the latch.

The frame C is oscillated from side to side by a connecting-rod J from a crank-wheel or eccentric K, mounted upon a shaft L, journaled outside of the machine, and driven by a beveled gear or other suitable connection with any convenient moving part of the machinery. This causes a constant transverse reciprocation of the frame C, and in order to cause it to rake the grain from the sides toward the center each end of the frame must be alternately raised above the chaff and grain as it approaches the side of the screen-shoe and dropped, so that the rake-teeth will engage this material and rake it transversely toward the center, the operation of the opposite end being precisely the same. This movement is effected by the cam-guides D previously described. The rollers F of the frame C drop by gravitation upon the bottom of the lower part of the cam-groove as that end of the rake-frame C reaches the outer end of its travel, and in returning moves toward the center of the shoe in the lower groove. The teeth at that end of the rake will then be depressed closely enough to the screen to rake the material which may lie upon that side toward the center. When the roller F approaches the inner end of the cam-groove, it passes beneath the latch H, which easily rises to allow it to pass and immediately drops back into position as soon as the roller has passed. As soon as the frame C commences to return in its reciprocation it is guided by this latch H, so as to pass over the top channel of the cam-groove D, and this end of the rake-frame is thus raised above the material which lies upon the screen and the rake passes back to the outside of the shoe at a height sufficient to clear it from the grain.

By reference to Fig. 1 it will be seen that while the one side of the rake-frame is being drawn from the side toward the center and along the bottom of its cam-guide the other side of the frame is passing above the guide-latch H and is being raised above the material on the screen, so that each side of the rake-frame is alternately drawn from the side of the shoe toward the center in close proximity with the screen and then raised, so as to return from the center toward the outside at a considerable height above the screen.

It will be manifest that the length of stroke and the curvature of the cam-grooves may be arranged to suit the conditions of the work to be done.

If the machine is working upon level ground where this device is not necessary, the connecting-rod J may be detached from the crank-wheel K and both ends of the rake raised to the upper part of the cam-groove, where it will rest and remain out of contact with the material on the screen. By this construction I have a simple direct operating mechanism working alternately from each side of the machine toward the center, and the whole is actuated by a single shaft and crank connection.

Having thus described my invention, what I claim as new, and desire to secure by Letters Patent, is—

1. The combination, with the cleaning-shoe of a separator, of the transversely-reciprocating rakes moving laterally across its surface, and guides or cams within which the ends of the rake travel, said guides or cams being relatively reversed and having raised top channels or grooves, whereby the rake-teeth are alternately depressed toward the surface of the screen when moving toward the center and raised therefrom when returning toward the outside, substantially as herein described.

2. The combination, with the cleaning-shoe of a separator, of a frame having teeth projecting from the lower sides of its bars toward the screen, travelers projecting from each of the angles of the frame, the relatively-reversed channeled cam-guides fixed with relation to the angles of the frame, so that the travelers project into the channels, and guide-latches H, pivoted in the guide-channels near their adjacent ends, so that the travelers and the ends of the frame to which they are connected pass along the lower part of the guide-channels as they move from the sides toward the center and return in the upper channels when moving from the center toward the outside, substantially as herein described.

3. In a grain-cleaning machine, the shoe containing the cleaning-screens, a frame having rake-teeth projecting from its lower surface toward the screen, a crank-wheel and connecting-rod by which said frame is reciprocated transversely across the shoe, travelers projecting from each angle to the rake-frame, the oppositely-located relatively-reversed cam-shaped guide-channels supported with relation to the frame, so that said travelers move in the channels, and spring-actuated guide-latches H, pivoted in the lower part of the guide-channels near their adjacent ends, said latches being movable, so as to allow the travelers to pass beneath them when moving from the side toward the center, and closing down, so that the travelers pass above them when moving from the center toward the sides of the machine, substantially as herein described.

In witness whereof I have hereunto set my hand.

HENRY BRYAN.

Witnesses:
S. H. NOURSE,
H. F. ASCHECK.